(12) United States Patent
O'Kidhain

(10) Patent No.: US 10,733,902 B2
(45) Date of Patent: Aug. 4, 2020

(54) AFFECTIVE EMPATHY SYSTEM

(71) Applicant: Ian Littleton O'Kidhain, Yukon, OK (US)

(72) Inventor: Ian Littleton O'Kidhain, Yukon, OK (US)

( * ) Notice: Subject to any disclaimer, the term of this patent is extended or adjusted under 35 U.S.C. 154(b) by 267 days.

(21) Appl. No.: 15/795,524

(22) Filed: Oct. 27, 2017

(65) Prior Publication Data

US 2018/0122261 A1  May 3, 2018

Related U.S. Application Data

(60) Provisional application No. 62/413,722, filed on Oct. 27, 2016.

(51) Int. Cl.
*G09B 19/00* (2006.01)
*E04H 1/12* (2006.01)
*G09B 5/06* (2006.01)

(52) U.S. Cl.
CPC ............ *G09B 19/00* (2013.01); *E04H 1/12* (2013.01); *E04H 1/125* (2013.01); *G09B 5/06* (2013.01); *G09B 5/065* (2013.01)

(58) Field of Classification Search
CPC ...... G09B 19/00; G09B 5/065; G09B 19/069; G09B 5/00; G09B 5/06; F04H 1/12; E04H 1/12; E04H 1/125; H04L 65/403; H04L 67/12; G06K 9/00302; G06Q 50/205

See application file for complete search history.

(56) References Cited

U.S. PATENT DOCUMENTS

| | | |
|---|---|---|
| 5,013,740 A | 5/1991 | Glover |
| 5,028,612 A | 7/1991 | Glover |
| 6,425,764 B1 | 7/2002 | Lamson |
| 8,489,527 B2 | 7/2013 | van Coppenolle et al. |
| 9,308,445 B1 | 4/2016 | Merzenich et al. |
| 9,911,352 B2* | 3/2018 | Williams ............... G09B 7/02 |
| 10,204,525 B1* | 2/2019 | Tillis ...................... G09B 5/02 |
| 2011/0301433 A1 | 12/2011 | Sadowsky et al. |
| 2013/0115582 A1 | 5/2013 | el Kaliouby et al. |
| 2019/0118016 A1* | 4/2019 | Severijns ........... A62C 99/0081 |

* cited by examiner

*Primary Examiner* — Timothy A Musselman
(74) *Attorney, Agent, or Firm* — Hall Estill Attorneys at Law; Tyler Mantooth

(57) ABSTRACT

An affective empathy system can have a frame with at least one panel. The frame may define an interior region sized to accommodate a user. A first monitor can be positioned within the interior region of the frame with a second monitor positioned external to the interior region of the frame. A computing device may be connected to the first and second monitors and configured to increase affective empathy in the user via the first and second monitors.

20 Claims, 6 Drawing Sheets

FIG. 2A
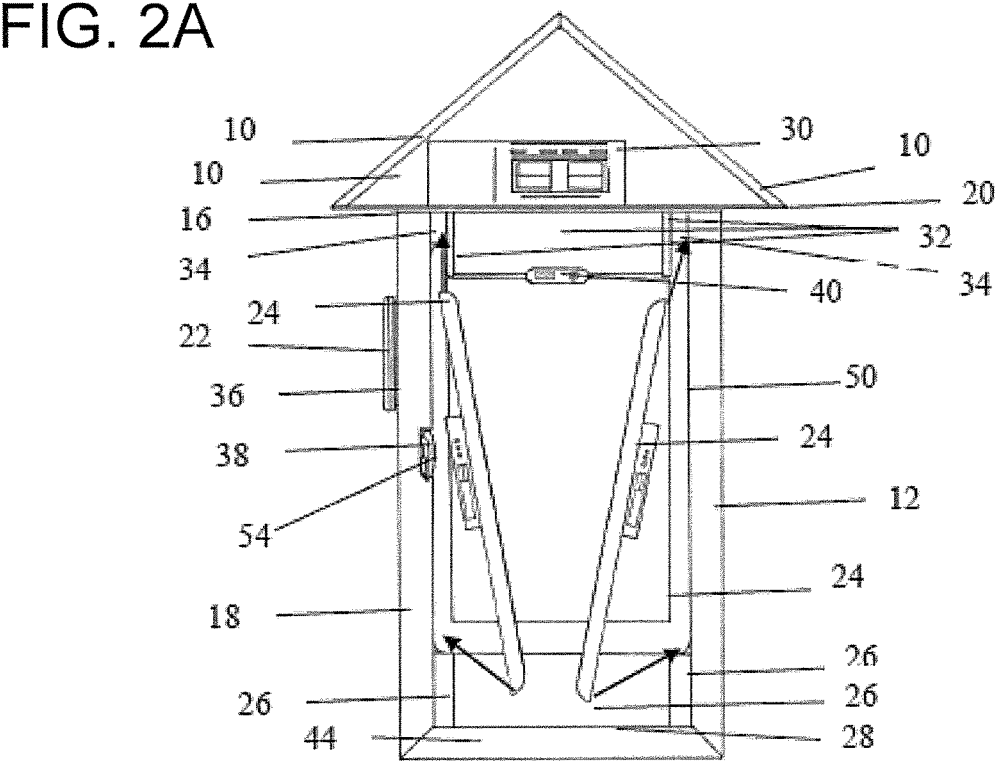
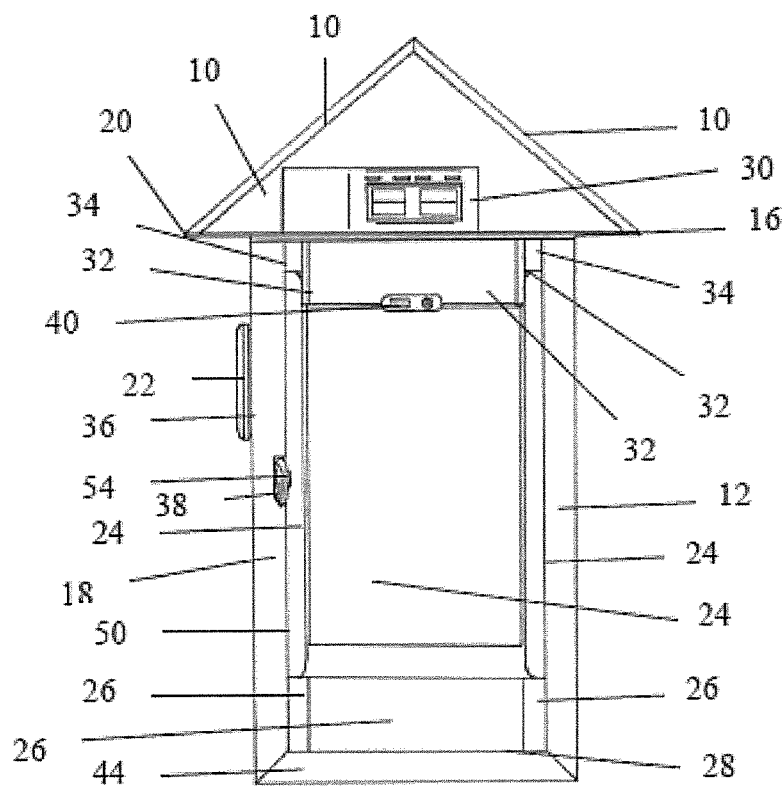
FIG. 2B

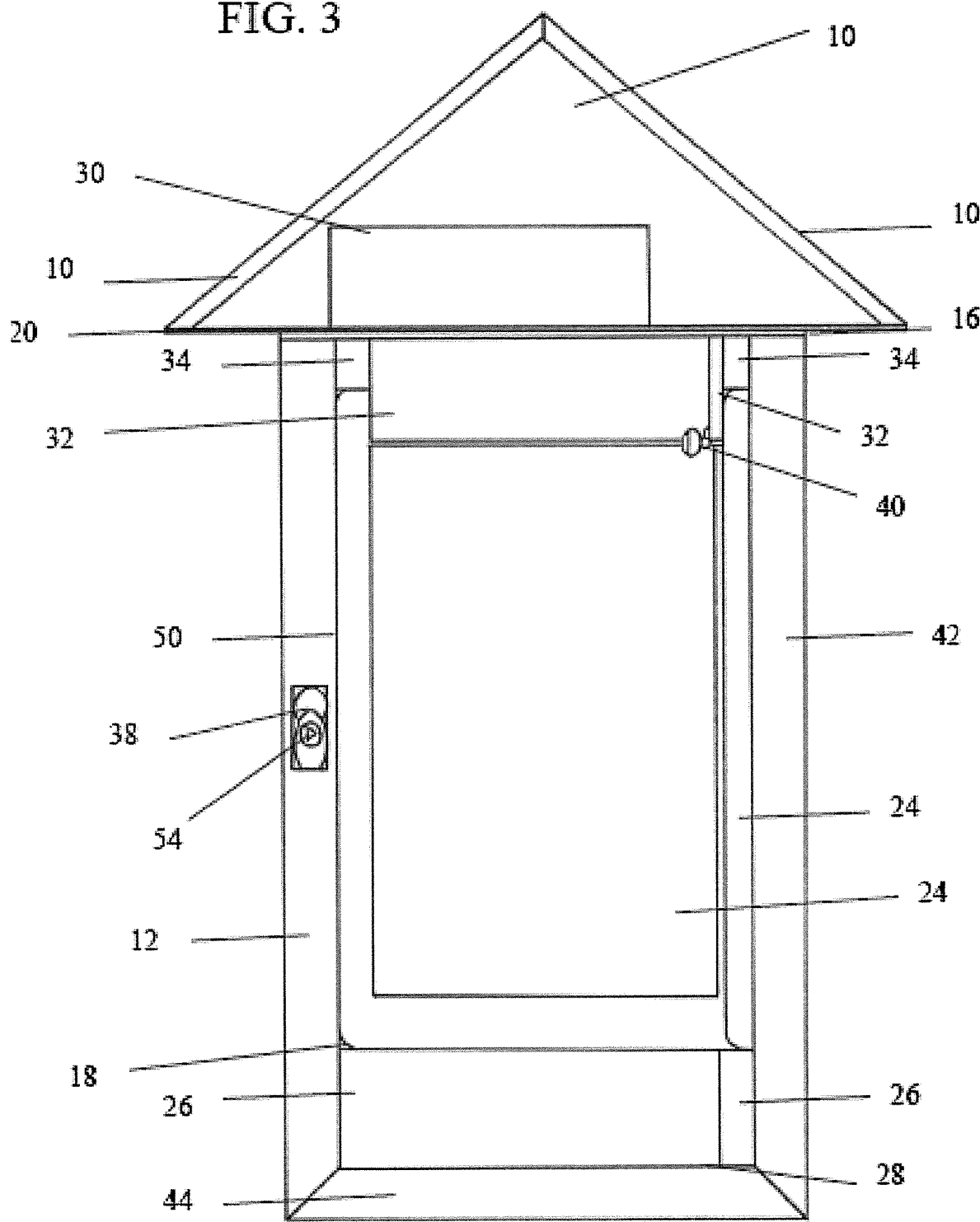

US 10,733,902 B2

AFFECTIVE EMPATHY SYSTEM

RELATED APPLICATION

The present application makes a claim of domestic priority to U.S. Provisional Patent Application No. 62/413,722 filed Oct. 27, 2016, the contents of which are hereby incorporated by reference.

SUMMARY

An affective empathy system, in some embodiments, has a frame with at least one panel. The frame defines an interior region sized to accommodate a user. A first monitor is positioned within the interior region of the frame with a second monitor positioned external to the interior region of the frame. A computing device is connected to the first and second monitors and is configured to increase affective empathy in the user via the first and second monitors.

BRIEF DESCRIPTION OF THE DRAWINGS

FIGS. 2A and 2B respectively show an example affective empathy system arranged in accordance with various embodiments.

FIG. 3 displays an example affective empathy system according to various embodiments.

DETAILED DESCRIPTION

Figure 1A:
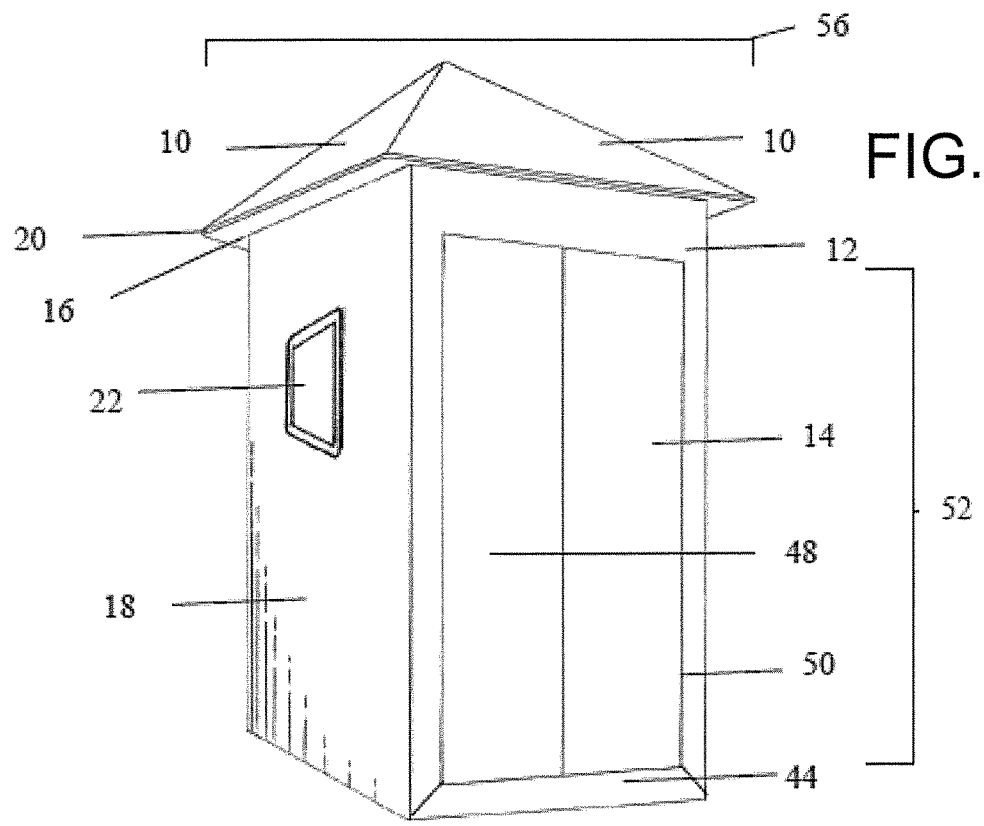
FIGS. 1A and 1B respectively depict an example affective empathy system configured according to various embodiments.
Figure 1B:
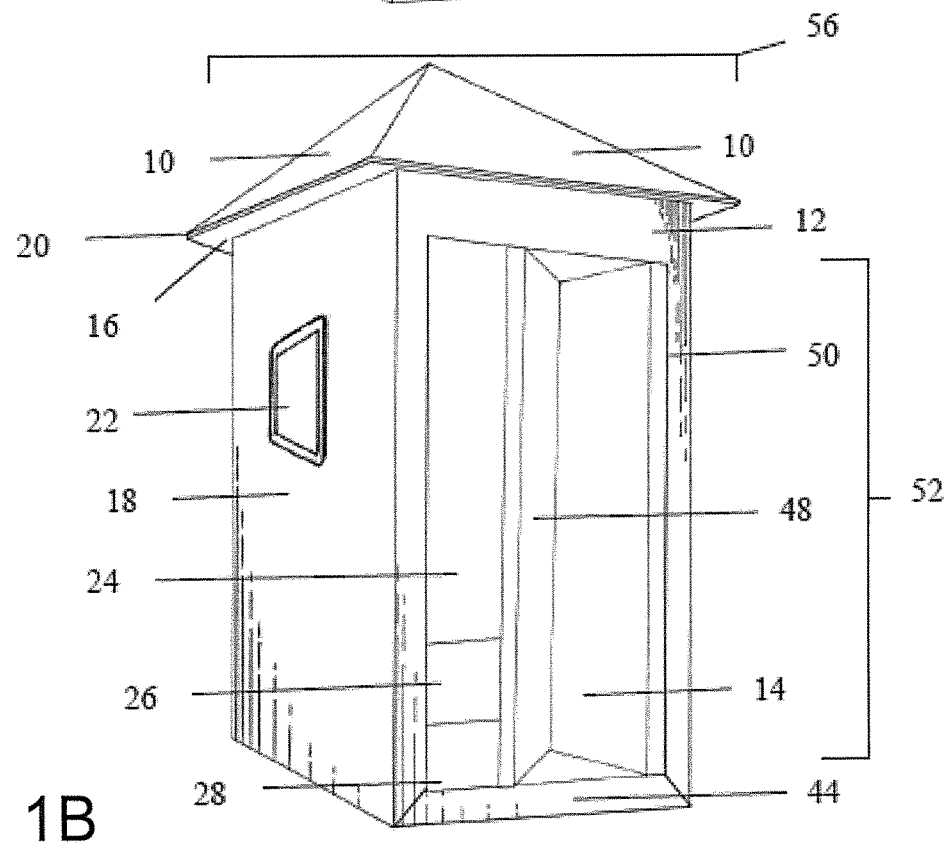

Various embodiments of the present disclosure are generally directed to an affective empathy system that instantly stimulates predetermined portions of the brain of a user.

Some embodiments configure a device to stimulate the anterior insular cortex region of the brain of a user to instantly increase levels of affective empathy through a simultaneous cognitive and physical (i.e., visual and auditory) perspective-taking exercise type of experience, which further relates to the individual point of view of the participant.

The usage of perspective-taking exercises has been part of a growing area of empathy research within the field of neuroscience. Perspective-taking is the process of perceiving a condition or a situation from an alternate point of view. Specifically, perspective-taking exercises stimulate the participant cognitively or physically to simulate the state of another individual. During the exercise, the right inferior parietal, the precuneus, the midcingulate, the insular, and the somatosensory cortex regions in the brain are stimulated. Of these, the insular cortex is the principle center of development of affective empathy, where affective empathy is defined as the capacity of an individual to respond appropriately and with emotional sensitivity to the mental state of another individual. Also, during the exercise, the perspective of the participant is temporarily suspended so that the participant is able to perceive circumstances of a given situation as another individual might.

There are many perspective-taking exercises which elicit a response in the participant. Of these exercises, there are exclusively cognitive exercises, such as having the participant meditate on past experiences, having the participant use stereotypes to consider reactions of different groups, and having the participant imagine himself or herself in the place of another individual. Of perspective-taking exercises, there are also exclusively physical exercises, which use the senses, including having the participant focus on photographs of another individual, having the participant manipulate a virtual avatar, and having the participant perceive a disguised form of herself or himself in a mirror. However, the most effective perspective-taking exercise is introducing the participant to an artificial, engaging situation that is interactive both cognitively and physically.

Certain programs have been developed that induce perspective-taking by engaging the participant on a cognitive or on a physical level, which result in a shallow augmentation of the participant's empathy through a gradual increase from multiple instances. The programs are configured to elicit a response through either the manipulation of the participant's physical senses or the encouragement of the participant to adopt a cognitively specific and unique perception of a situation.

However, to date, there have been no programs or devices that are explicitly configured to stimulate the brain to instantly increase the level of affective empathy. Moreover, the various perspective-taking exercise programs often suffer drawbacks that hinder the profundity and the efficacy of the experience for the participant. These programs are usually only able to provide direct stimulation through one sense, such as vision, which results in a weak experience and which results in a change of the participant's perspective for only a limited amount of time, such as thirty minutes. Moreover, those devices which merely stimulate the anterior insular cortex also result in a shallow effect for a limited amount of time. Stimulation of the anterior insular cortex alone, without the usage of a perspective-taking exercise, is not enough to instantly and profoundly alter the degree of affective empathy of a participant.

Also, to be at all effective, these programs usually require that the participant preemptively adopt a point of view that is, at best, very cognitively demanding and, at worst, is impossible for a number of participants. This point of view necessitates that the participants temporarily discard their implicit biases, where an implicit bias is defined as an attribution of particular qualities to something, such as a group of people, that operates at a level below conscious awareness. These biases are often automatically activated, so it is extremely challenging or impossible to consciously overcome them. Thus, the programs are unable to accommodate every participant, resulting in the need to screen candidates for participation.

Another drawback is that many of these programs induce a single, isolated experience with another point of view but without relating that experience back to the participant. Lacking this crucial detail, the programs result in the stimulation of the midcingulate cortex, but not in the explicit stimulation of the anterior insular cortex. Therefore, these experiences do not instantly increase the measurable level of affective empathy in the participant.

Another drawback is that all of these devices require a plurality of instances to provide benefit instead of a single episode with the device. Thus these devices are impractical and provide shallow efficacy for the user. Therefore, these devices do not instantly and noticeably increase the actual level of affective empathy in the user in a measurable way.

All of these disadvantages work together to increase the difficulty in inducing an effective adoption of an alternate point of view resulting in a development of affective empathy for a large number of people.

Therefore, a need exists in the field for a new device capable of inducing a participant to take another's perspective through both physical and cognitive means, and in such a way as to stimulate the anterior insular cortex and to increase the level of affective empathy of the participant. A further need exists for an affective empathy increasing device that is applicable to a large population of participants. Also, there is a need for an affective empathy increasing device that is configured to relate the experience back to the participant in order to actually stimulate the anterior insular cortex region of the brain of the participant, instead of merely the midcingulate cortex, in order to increase the degree of affective empathy. Finally, there exists a further need for an affective empathy increasing device that provides an instantaneous and noticeable augmentation of the user's empathy, rather than merely a shallow increase over the course of a plurality of instances with the device.

In some embodiments, an affective empathy system can have a frame comprising at least one panel with the frame defining an interior region sized to accommodate a user. A first monitor can be positioned within the interior region of the frame while a second monitor is positioned external to the interior region of the frame. A computing device connected to the first and second monitors can be configured to increase affective empathy in the user via the first and second monitors.

The frame may be enclosed by at least one panel, a floor, and a door. The first monitor can be oriented at an angle non-orthogonal to the user. The computing device may be connected to a camera positioned within the interior region of the frame. The first monitor can be positioned above a floor of the frame to position at least a portion of the first monitor at an eye-level of the user.

The first monitor may be physically separate from a third monitor and a fourth monitor with the third and fourth monitors each residing within the interior region of the frame. The second monitor may be mounted to at least one panel. The second monitor can be positioned at an eye-level of the user. A roof may contact the frame and cover the interior region while the computing device is positioned above the first monitor in the roof.

An affective empathy system may, in some embodiments, be operated by displaying a series of images to a user via a first monitor as directed by a computing device connected to the first monitor with the first monitor positioned in an interior region of a frame and the frame comprising at least one panel. At least one image is displayed to the user via a second monitor as directed by the computing device with the second monitor positioned external to the interior region of the frame. The series of images and at least one image are collectively configured by the computing device to increase affective empathy in the user.

The series of images may be displayed to the user concurrently with the first monitor, a third monitor, and a fourth monitor. The computing device can activate at least one sound in concert with the series of images. The series of images and at least one image may be different. The computer may automatically activate the first monitor in response to the user entering the interior region. The series of images can generate emotional stress in the user that increases the user's affective empathy.

A method of operating an affective empathy system, according to some embodiments, displays a series of images to a user via a first monitor as directed by a computing device connected to the first monitor while the first monitor is positioned in an interior region of a frame and the frame comprising at least one panel. At least one image is displayed to the user via a second monitor as directed by the computing device while the second monitor positioned external to the interior region of the frame. The collective effectiveness of the series of images and at least one image to increase affective empathy in the user can be verified with at least one sensor of the computing device.

The computing device can verify an increase in affective empathy by prompting the user for a conscious response at a prompted time. The verification can identify that a paracingulate gyrus, anterior cingulate cortex, and anterior insular cortex of the user are stimulated. At least one image may be a depiction of the user altered by the computing device to elicit a subconscious reaction.

It is noted that the terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing assorted embodiments, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Novel perspective-taking exercise inducing devices and apparatuses are discussed herein. In the following description, for the purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Assorted embodiments will now be described by referencing the appended figures representing preferred embodiments. FIGS. 1 through 4 illustrate an affective empathy increasing device, which comprises a frame for housing a plurality of monitors 24, a platform 20 to support a computer system 30 and a camera 40 within the interior, a door 52 attached to the door frame 50, a computer remote control 38 affixed inside of the door frame 50, a floor 28 to provide footing for a user, and a monitor 22 attached to the exterior.

The frame is preferably comprised of a rectangular cube structure and, as shown in FIGS. 1 through 4. In preferred embodiments, the frame is preferably formed of a floor 28, a ceiling 16, and a plurality of side panels 18 and 46, with a back panel 42 and a front panel 12, having a door frame 50 therein, plus a plurality of panels 10 which comprise the roof 56.

The floor 28 may be provided with a threshold 44 secured flush with the surface of the floor by means of a plurality of screws and adapted to provide a firm footing for a user upon entering the device.

The door frame 50 is adapted to be closed by a door 52 comprising a pair of door leaves 14 and 48.

The door leaves 14 and 48 are of substantially the same construction, having side frame members. I prefer to form the door leaves 14 and 48 of substantially equal width in order that there may be no parts of the door leaf 48 projecting from the device when the door leaves are in the folded position shown in FIG. 1. When an occupant enters the device, the door may be readily closed.

The door leaf 14, which is attached to the door frame 50 by means of the pintle rod 62, is pivotable in the door frame, by means of a plurality of hinges 64, preferably formed and attached in such a manner that the pivot point 66 of the hinge is spaced sufficiently from the edge of the door frame 50 so that the door leaf 14 may be folded against the side panel 46, thereby utilizing the space behind the door leaf 14 for receiving the doors in the folded position of FIG. 2.

The door leaves 14 and 48 are joined by a plurality of hinges 64, all of which are supported upon a pintle rod 62.

A plurality of panels 10 are joined by a plurality of standard L support brackets 68 to form the roof 56. The L support brackets 68 affix the roof 56 to platform 20 by means of a plurality of screws.

In preferred embodiments, there is a plurality of monitors 24 configured around the perimeter of the interior of the frame, on a plurality of side panels 18 and 46, and on the back panel 42. The monitors 24 may be of any size. The left sides 72 of each of the interior monitors 24 are set upon the supports 26 at the bottom of the interior of the frame. The right sides 74 of each of the interior monitors lay flat against the supports 32 at the top of the interior of the frame, which are attached to the frame by supports 34 and a plurality of screws, allowing the monitors 24 to slide freely in and out of the frame, as detailed in FIG. 2. The monitors 24 are connected to the computer 30 by means of standard AN cables 60.

Figure 4:
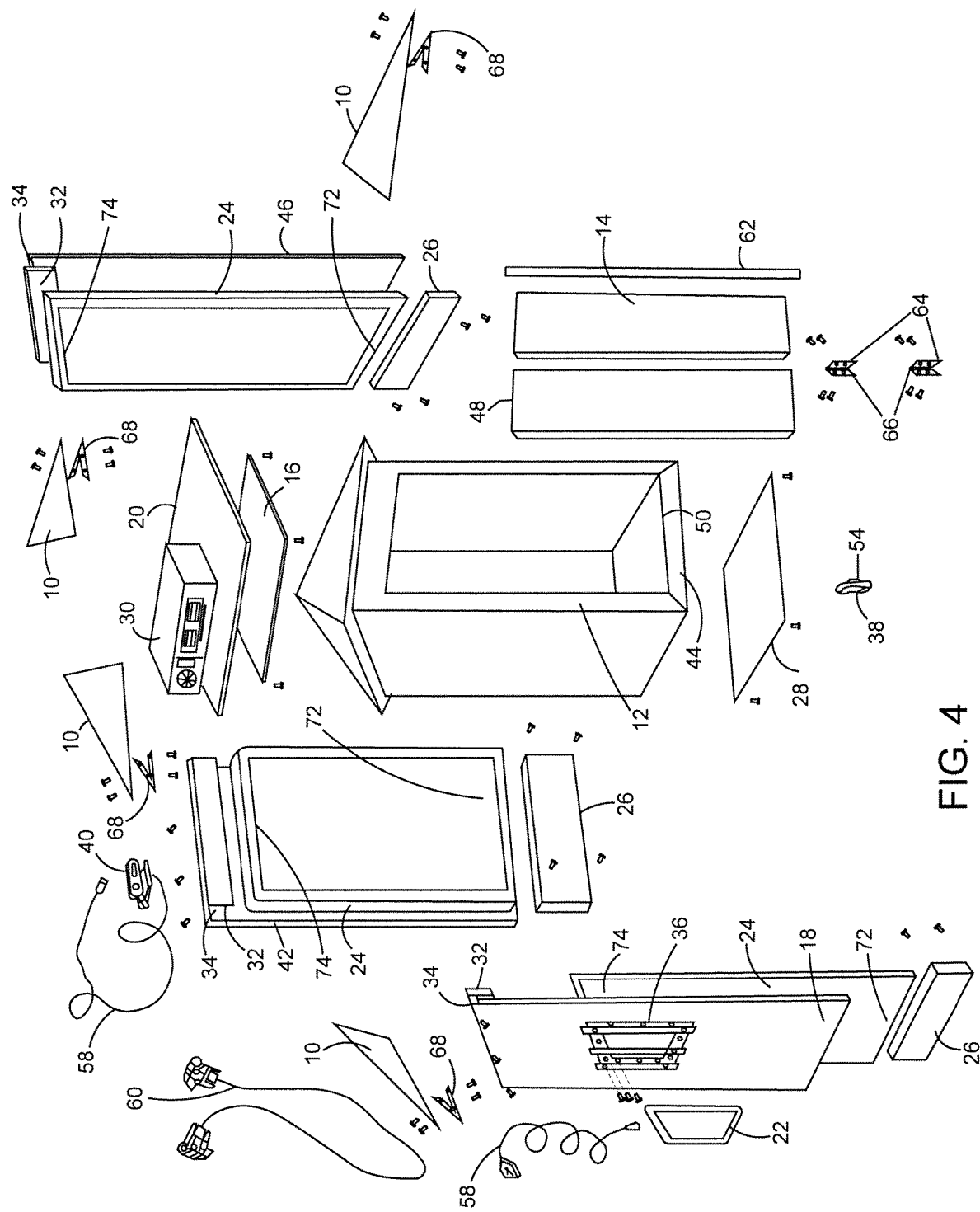
FIG. 4 is an exploded line representation of an example affective empathy system constructed and operated according to various embodiments.

In preferred embodiments, there is either a plurality of monitors or one monitor 22 attached to the exterior of either a plurality of or one side panel 18, side panel 46, back panel 42, or front panel 12. The monitor 22 is secured to the side panel 18, as shown in FIG. 4 by means of a standard TV mount 36 and a plurality of screws. The exterior monitor 22 is connected to the computer 30 by a standard AN cable 60.

The camera 40 is preferably mounted on one of a plurality of supports 32 by means of a plurality of screws. The camera 40 is connected to the computer 30 with a standard USB cable 58.

Referring to FIG. 3, it will be observed that the standard remote control 38 in the door frame 50 extends to the computer 30, by means of either a standard USB cable 58 or an infrared signal in preferred embodiments, which is capable of controlling the video 70 with standard video player software installed in the computer 30 and the camera 40 with standard camera software installed in the computer 30. Thus the video 70 and the camera 40 are connected to be controlled in parallel by the computer 30, which is activated by the single remote control 38.

The remote control 38 is preferably adapted to be actuated only after the door 52 has been moved to a predetermined closed or substantially closed position, and the remote control 38 is also preferably adapted to disengage as soon as the door 52 has been opened to a predetermined point.

The present method or system of affective empathy building as seen in FIG. and the operation of the device described herein is outlined briefly as follows.

When the device is not in use, the door 52 is open and the remote control 38 is disengaged, while the construction of the door frame 50 is sufficient to hold the remote control 38, as see in FIGS. 2 and 3, unengaged, under these conditions.

When a user enters the device and closes the door 52, the remote control 38 is permitted to engage under the action of its own standard enter button 54, and the computer 30 is activated and operates as soon as the door 52 has reached a predetermined position. Standard video player software is preferably present in the computer 30 for the purpose of playing a video 70 stored therein. The plurality of monitors 24, which are connected to the computer 30 by means of a plurality of standard A/V cables 60, are present to display the video 70.

In preferred embodiments, the video 70 is intended to generate a response from the user, like the perspective-taking exercises described previously. The video 70 may be either a plurality of different images or the same image. The video, of a predetermined length, which will be played by the standard video player software and displayed concurrently on the interior monitors 24, will preferably show a video which generates emotional stress in the user and which is intended to induce the user to experience another person's perspective and which is intended to stimulate one or more regions of the user's brain, with the objective of effectively and instantaneously increasing empathy in the user. The video 70 is customized to the user to ensure an empathy increasing result, and may include a video of a single person or a plurality of people, who can be various ages, from infants to seniors, and/or may include a video displaying one or a plurality of backgrounds, such as a building or a forest.

The video 70 is not limited to only the following instances, but some preferred embodiments are that the video may display either a single person or a plurality of people who appear to threaten physical harm to the user of the device, so that the user may better relate to the perspective of a victim of violence by understanding more about the experience of violence, and so that the user's paracingulate gyrus and anterior insular cortex are stimulated, resulting in increased empathy in the user; the video may display either a single person or a plurality of people who appear to yell discriminating, derisive statements, such as racial epithets, so that the user may better relate to the perspective of a victim of discrimination, such as racial, religious, socioeconomic, geographic, disability, and gender discrimination, and discrimination based upon age and sexual orientation, and so that the user's midcingulate cortex and anterior insular cortex are stimulated, resulting in increased empathy in the user; the video may display either a single person or a plurality of people who appear to be in a negative emotional state, such as angry or sad, so that the user may better relate to the emotional experiences of other people, and so that emotional contagion occurs and the user's anterior cingulate cortex and anterior insular cortex are stimulated, resulting in increased empathy in the user; the video may display either a single person or a plurality of people who appear to be in some trouble, such as being trapped and unable to free themselves, so that the user may better relate to the perspectives of people experiencing a serious crises, such as refugees, victims of natural disasters, and/or people suffering from mental or physical health issues, and so that the user's right angular gyrus and anterior insular cortex are stimulated, resulting in increased empathy in the user; the video may display either a single person or a plurality of people who appear to be in mortal danger, such as having a mortal wound without the apparent possibility of receiving aid, so that the user may better relate to the perspectives of people who are dying or suffering from an incurable, fatal disease, and so that the user's right angular gyrus, the left temporal lobe, the anterior cingulate cortex, and anterior insular cortex are stimulated, resulting in increased empathy in the user; the video may display either a single person or a plurality of people who appear to be experiencing an environment of extreme and intense conflict, such as fighting in a warzone or in a gang conflict, so that the user may better relate to the perspectives of people who are suffering from post traumatic stress disorder, anxiety, and/or depression originating in conflict, and so that the user's paracingulate gyrus, anterior cingulate cortex, and anterior insular cortex are stimulated, resulting in increased empathy in the user; and/or, the video may display the user's face to the user in a way that cannot be consciously recognized, but can be sub-consciously received by the user's brain, so that emotional contagion occurs and the user's anterior cingulate cortex, right prefrontal cortex, and anterior insular cortex are stimulated, resulting in increased empathy in the user.

Standard camera timer software is preferably present in the computer 30 for the purpose of activating the camera 40, which will take pictures and/or video of the face of the user 40 at a predetermined time.

When the video 70 ends at a predetermined time, the user may exit the device by pulling the door 52 inwards, thus opening the door.

In preferred embodiments, the monitor 22 attached to the exterior of one side panel 18 will display the photographs and/or video taken by the camera 40.

Figure 5:
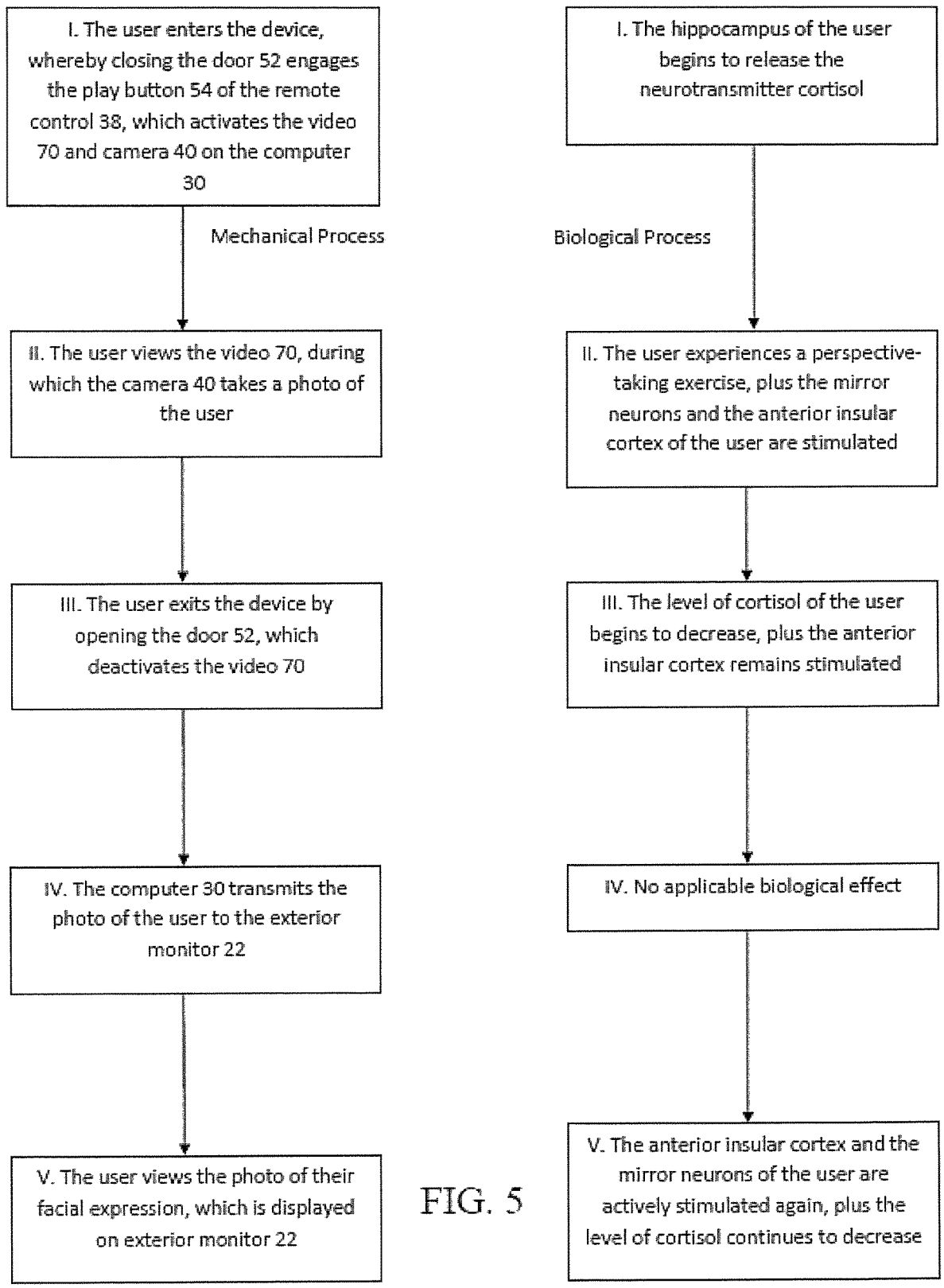
FIG. 5 is flowcharts of processes conducted by an affective empathy system in accordance with some embodiments.
Figure 6:
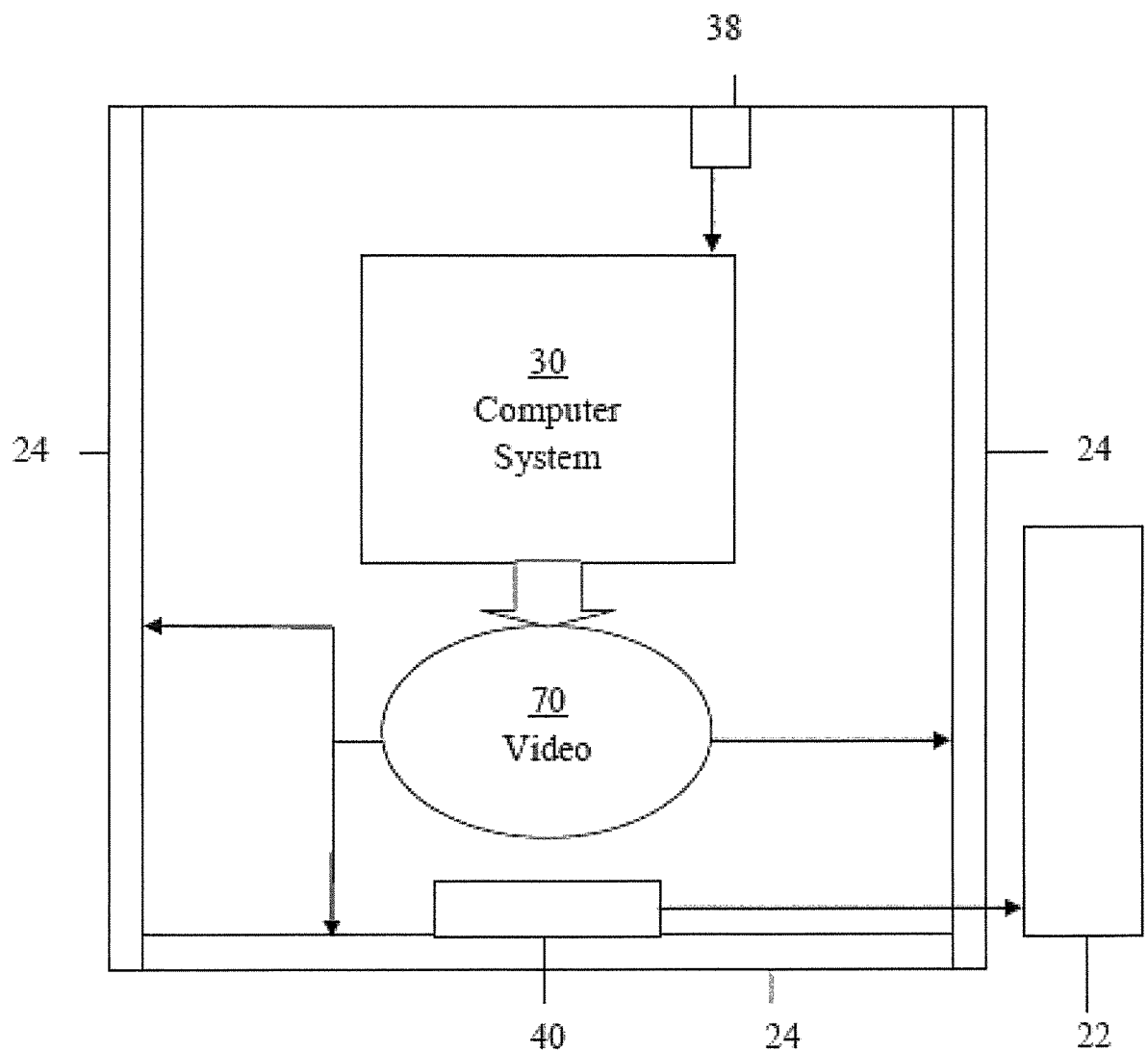
FIG. 6 conveys a block representation of portions of an example affective empathy system arranged in accordance with assorted embodiments.

When the user views the photographs and/or video, this event is intended to trigger the mirror neurons of the brain to directly stimulate the anterior insular cortex, as detailed in FIG. 5, and thus to increase the level of affective empathy of the user.

Generally, having multiple monitors inside the frame is useful in stimulating the portions of the user's brain associated with affective empathy. Multiple monitors inside the frame create an effect that makes the user feel surrounded by a mob. By doing so, the experience is both more immersive and more uncomfortable, which is necessary to elicit emotional contagion in the user. (Emotional contagion is a principal, initial part of feeling empathy, and being uncomfortable engenders emotional contagion.)

The angled orientations of the monitors inside the frame are useful in stimulating the desired portions of the brain in different manners than if the monitors were flat. Regardless of whether the frame houses multiple angled monitors or one curved monitor, the important factor is to create an immersive experience. Flat monitors set against the frame walls wouldn't give the desired effect because the user could see gaps in-between the video montages, thus the experience would not be wholly immersive. Moreover, because the sound comes from the monitors, this helps to project the sound directly at the user; although, this effect could also be achieved with the use of speakers.

It is useful to have the user fully enclosed in order to block out any outside stimuli that might interrupt the experience of the system. Plus, the dark, enclosed frame provides more discomfort for the user, thereby facilitating emotional contagion (i.e., one of the first steps of feeling empathy). The dark, enclosed frame also helps the user to feel disconnected from the world outside of the device and encourages the user to stand still, which helps to dampen the user's sense of touch. (Neuroscientists have found that if we can dampen a user's sense of touch and cause them to feel disconnected from stimulation external to an experiment space, then a perspective-taking exercise is more effective.)

It would be useful to use simple light sequences and intensities in combination with the monitors inside the frame. The use of certain light intensities and sequences in conjunction with the video montages can increase the effectiveness of the system. However, it's not necessary, and the affective empathy system may only house a single, bright light, projected onto the user. This is both to help capture video of the user's facial responses and to make the user uncomfortable, with the objective of facilitating emotional contagion.

In some embodiments, the video/images are intelligently altered inside the frame in response to detected reactions of the user. The video montages inside the frame could be intelligently altered in real-time in order to help make the experience either more or less intense, based upon the reactions of the user. This would be useful in the case that a more intense version of the video montage is necessary to effectively elicit a response, and in the case that a video montage is too intense, and therefore less effective.

It is contemplated that an increase in affective empathy is verified with pre-test and post-test procedure being employed using two different resources. Specifically, the Implicit Association Test is used for examining the successfulness of the device at shifting the user's implicit biases towards one of no preference. A pre-test and post-test procedure is employed using the Barrett-Lennard Relationship Inventory for verifying the successfulness of the device at increasing the user's affective empathy.

While the assorted drawings illustrate assorted affective empathy system embodiments, many modifications may be made without departing from the spirit of the present disclosure. As such, the illustrated embodiments are not limited to the precise details of construction set forth.

While preferred materials for elements have been described, the system is not limited by these materials. Wood, plastics, rubber, foam, metal alloys, aluminum, and other materials may comprise some or all of the elements of the affective empathy increasing devices and apparatuses in various embodiments of the present affective apathy system.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are contemplated thereby.

What is claimed is:

1. An apparatus comprising:
a frame comprising at least one panel, the frame defining an interior region sized to accommodate a user;
a first monitor positioned within the interior region of the frame;
a second monitor position external to the interior region of the frame; and
a computing device connected to the first and second monitors, the computing device configured to increase affective empathy in the user via the first and second monitors by stimulating the anterior insular cortex, paracingulate gyrus, and anterior cingulate cortex of a brain of the user, the stimulation verified by at least one sensor of the computing device.

2. The apparatus of claim 1, wherein the frame is enclosed by at least one panel, a floor, and a door.

3. The apparatus of claim 1, wherein the first monitor is oriented at an angle non-orthogonal to the user.

4. The apparatus of claim 1, wherein the computing device is connected to a camera positioned within the interior region of the frame.

5. The apparatus of claim 1, wherein the first monitor is elevated above a floor of the frame to position at least a portion of the first monitor at an eye-level of the user.

6. The apparatus of claim 1, wherein the first monitor is physically separate from a third monitor and a fourth monitor, the third and fourth monitors each residing within the interior region of the frame.

7. The apparatus of claim 1, wherein the second monitor is mounted to at least one panel.

8. The apparatus of claim 1, wherein the second monitor is positioned at an eye-level of the user.

9. The apparatus of claim 1, wherein the interior region is covered by a roof.

10. The apparatus of claim 9, wherein the computing device is positioned above the first monitor in the roof.

11. A method comprising:
displaying a series of images to a user via a first monitor as directed by a computing device connected to the first monitor, the first monitor positioned in an interior region of a frame, the frame comprising at least one panel; and
displaying at least one image to the user via a second monitor as directed by the computing device, the second monitor positioned external to the interior region of the frame, the series of images and at least one image collectively configured by the computing device to increase affective empathy in the user by stimulating an anterior insular cortex, paracingulate gyrus, anterior cingulate cortex, and midcingulate cortex with triggered mirror neurons of a brain of the user, the stimulation verified by at least one sensor of the computing device.

12. The method of claim 11, wherein the series of images are displayed to the user concurrently with the first monitor, a third monitor, and a fourth monitor.

13. The method of claim 11, wherein the computing device activates at least one sound in concert with the series of images.

14. The method of claim 11, wherein the series of images and at least one image are different.

15. The method of claim 11, wherein the computer automatically activates the first monitor in response to the user entering the interior region.

16. The method of claim 11, wherein the series of images generates emotional stress in the user that increases the user's affective empathy.

17. A method comprising:
displaying a series of images to a user via a first monitor as directed by a computing device connected to the first monitor, the first monitor positioned in an interior region of a frame, the frame comprising at least one panel;
displaying at least one image to the user via a second monitor as directed by the computing device, the second monitor positioned external to the interior region of the frame; and
verifying the series of images and at least one image collectively stimulated at least an anterior insular cortex, paracingulate gyrus, and anterior cingulate cortex of a brain of the user to increase an affective empathy in the user with at least one sensor of the computing device.

18. The method of claim 17, wherein the computing device verifies an increase in affective empathy by prompting the user for a conscious response at a prompted time.

19. The method of claim 17, wherein the verification identifies that the paracingulate gyrus, anterior cingulate cortex, and anterior insular cortex of the user are stimulated with two or more sensors.

20. The method of claim 17, wherein at least one image is a depiction of the user altered by the computing device to elicit a subconscious reaction.

* * * * *